(12) United States Patent
Chatterjee et al.

(10) Patent No.: US 6,947,440 B2
(45) Date of Patent: Sep. 20, 2005

(54) SYSTEM AND METHOD FOR INTERNET PAGE ACCELERATION INCLUDING MULTICAST TRANSMISSIONS

(75) Inventors: Aditya N. Chatterjee, Montgomery Village, MD (US); Richard C. Nelson, McLean, VA (US); Anand Jagannathan, Falls Church, VA (US); Steven R. Bowers, Herndon, VA (US); Roberto G. Rodrigues, McLean, VA (US); Hanny P. Kadrichu, North Potomac, MD (US); Yaron Reshef, Rockville, MD (US); Alan Schneider, Oak Hill, VA (US)

(73) Assignee: Gilat Satellite Networks, Ltd., Petah Tikva (IL)

( * ) Notice: Subject to any disclaimer, the term of this patent is extended or adjusted under 35 U.S.C. 154(b) by 724 days.

(21) Appl. No.: 09/781,554

(22) Filed: Feb. 13, 2001

(65) Prior Publication Data

US 2001/0043600 A1 Nov. 22, 2001

Related U.S. Application Data

(60) Provisional application No. 60/262,647, filed on Jan. 22, 2001, and provisional application No. 60/182,537, filed on Feb. 15, 2000.

(51) Int. Cl.[7] .............................................. H04L 12/54
(52) U.S. Cl. ..................... 370/429; 709/203; 709/219; 711/118
(58) Field of Search ................................ 370/316, 428, 370/429; 709/203, 219; 711/118

(56) References Cited

U.S. PATENT DOCUMENTS

| | | | |
|---|---|---|---|
| 5,727,129 A | 3/1998 | Barrett et al. | |
| 5,761,683 A | 6/1998 | Logan et al. | |
| 5,812,545 A | 9/1998 | Liebowitz et al. | |
| 5,929,850 A | 7/1999 | Broadwin et al. | |

(Continued)

FOREIGN PATENT DOCUMENTS

| | | |
|---|---|---|
| JP | 55-120249 | 9/1980 |
| JP | 59-135948 | 8/1984 |
| JP | 60-167533 | 8/1985 |
| JP | 62-189823 | 8/1987 |

(Continued)

OTHER PUBLICATIONS

"NetGuard Unveils Guardian Internet Firewall for Windows NT and OS/2 Warp", Dialog File 649: Gale Newswire ASAP 2003 © The Gale Group, Apr. 30, 1996; pp. 1–4.

"Lanoptics Netguard: Netguard ships Guardian version 2.0; Enhanced Firewall product provides unique real time internet management functionality and customizable report information", Dialog ® File 810: Business Wire © 1999 Business Wire, Oct. 16, 1996, pp. 1–4.

"Internet Wrld Exhibitors: Fall Internet World '96 Exhibitor Previews—Part Three of Five", Dialog ® File 810:Business Wire © 1999 Business Wire, Dec. 3, 1996, pp. 1–11.

(Continued)

Primary Examiner—Melvin Marcelo
(74) Attorney, Agent, or Firm—Banner & Witcoff, Ltd.

(57) ABSTRACT

A broadband communication system with improved latency is disclosed. The system employs distributed caching techniques to assemble data objects at locations proximate to a source to avoid latency over delayed links. The assembled data objects are then multicast to one or more remote terminals in response to a request for the objects, thus reducing unnecessary data flow across the satellite link.

96 Claims, 7 Drawing Sheets

U.S. PATENT DOCUMENTS

| | | | |
|---|---|---|---|
| 5,987,233 | A | 11/1999 | Humphrey |
| 5,991,306 | A | 11/1999 | Burns et al. |
| 5,995,725 | A | 11/1999 | Dillon |
| 6,016,388 | A | 1/2000 | Dillon |
| 6,023,605 | A | 2/2000 | Sasaki et al. |
| 6,038,594 | A | 3/2000 | Puente et al. |
| 6,078,810 | A | 6/2000 | Olds et al. |
| 6,115,384 | A | 9/2000 | Parzych |
| 6,115,750 | A | 9/2000 | Dillon et al. |
| 6,161,141 | A | 12/2000 | Dillon |
| 6,205,473 | B1 | 3/2001 | Thomasson et al. |
| 6,282,542 | B1 | 8/2001 | Carneal et al. |
| 6,321,268 | B1 | 11/2001 | Dillon et al. |
| 6,338,131 | B1 | 1/2002 | Dillon |
| 6,427,172 | B1 * | 7/2002 | Thacker et al. ............. 709/235 |
| 2002/0007374 | A1 * | 1/2002 | Marks et al. ................ 707/513 |
| 2002/0055966 | A1 * | 5/2002 | Border et al. ................ 709/200 |
| 2003/0112772 | A1 * | 6/2003 | Chatterjee et al. .......... 370/316 |

FOREIGN PATENT DOCUMENTS

| | | |
|---|---|---|
| JP | 63-194426 | 8/1988 |
| JP | 4-306934 | 10/1992 |
| JP | 5-157565 | 6/1993 |
| JP | 5-252085 | 9/1993 |
| JP | 5-252087 | 9/1993 |
| JP | 5-252165 | 9/1993 |
| JP | 6-170823 | 6/1994 |
| JP | 6-252896 | 9/1994 |
| JP | 9-508228 | 8/1997 |
| WO | WO 99/08429 | 2/1999 |
| WO | WO 99/16201 | 4/1999 |

OTHER PUBLICATIONS

Kosuke et al., "Communication Systems Using Line in Common", Patent Abstracts of Japan, Section: E, Section No. 579, vol. 12, No. 35, Feb. 2, 1988, p. 120.

Fumitoshi, "Silicon Single–Crystal Substrate", Patent Abstracts of Japan, Section: E, Section No. 1193, vol. 16, No. 166, Apr. 22, 1992, p. 149.

Nobuyuki et al., "Satellite Communication System", Patent Abstracts of Japan, Section: E, Section No. 429, vol. 10, No. 240, Aug. 19, 1986, p. 32.

Katsuhiro et al., "Satellite Communcation Equipment", Patent Abstracts of Japan, Section: E, Section No. 1487, vol. 18, No. 10, Jan. 10, 1994, p. 101.

Kazutomo, "Satellite Packet Communication Method", Patent Abstracts of Japan, Section: E, Section No. 660, vol. 12, No. 351, Sep. 20, 1988, p. 25.

Brooks et al., "Application–Specific Proxy Servers as HTTP Stream Transducers", www.w3.org/conferences/WWW4/papers/56/, Apr. 30, 2003, pp. 1–11.

"WWW Collector—The Prefetching Proxy Service for WWW", Wcol: WWW Collector, p. 1, retrieved Apr. 30, 2003.

Zelinka, "Guardian offers a sophisticated, PC–based firewall", INFOWORLD, www.inforworld.com, Jul. 29, 1996, p. 1.

Wang et al., "Prefetching in World Wide Web", Department of Computer Science, University of College London, 1995, pp. 1–12.

Shrikumar, "Thinternet: Life at the End of a Tether", Thinternet—Life on a Tether Proc. INET '94/JENC5 H. Shrinkumar, pp. 1–14.

"Wormhole Caching with HTTP PUSH Method for a Satellite–Based Web Content Multicast and Replication System", Hua Chen, et al., AT&T Systems, Mar. 1999, pp. 1–12, XP002201410.

* cited by examiner

SYSTEM AND METHOD FOR INTERNET PAGE ACCELERATION INCLUDING MULTICAST TRANSMISSIONS

CROSS REFERENCE TO RELATED APPLICATIONS

The present application claims priority to provisional patent application Ser. No. 60/262,647 entitled System and Method For Internet Page Acceleration Including Multicast Transmission, filed Jan. 22, 2001; which is a provisional continuation-in-part application of U.S. provisional patent application Ser. No. 60/182,537, filed Feb. 15, 2000, and entitled System and Method For Internet Page Acceleration Including Multicast Transmission, each of which is incorporated by reference herein.

FIELD OF THE INVENTION

The present invention relates to broadband communication systems. More particularly, the present invention relates to a communications system that communicates between a central telecommunications network and at least one remote station using a satellite communication link.

BACKGROUND OF THE INVENTION

Various data caching systems are well known in the art for storing the contents of Internet pages, Web or data pages, in a cache memory for local display by a Web browser For example, previously when the World Wide Web (WWW) was accessed primarily through relatively a slow dial-up link, a Web browser would often include a list of favorite Web sites. The entire contents of each Web site in the list would be downloaded overnight and continuously updated so that the experience associated with accessing a Web site contained in the list would be improved.

Some browsers include the ability to parse the contents of a Web page so that referenced objects, such as links to other Web pages, can be pre-fetched and stored in cache, thereby facilitating quick access to the linked Web pages.

Currently, there are many cache systems for the Internet. Some cache systems are located at a server, some are located at a client, and still others are distributed throughout the computer networks forming the Internet, such as being distributed between an Internet Service Provider (ISP), a hub and/or a central server location. See, for example, U.S. Pat. No. 5,727,129 to Barrett et al., U.S. Pat. No. 5,761,683 to Logan et al., and WO 99/16201 invented by K. L. El-Rafie. Additionally, companies such as Cidera (SkyCache), StarBurst, Cisco, and Teleglobe provide distributed caching systems.

More recently, communications between distributed cache engines have been standardized in accordance with ICP (Internet Cache Protocol) RFC 2186. Consequently, in many of the distributed cache systems, a proxy server configuration is utilized in which a user selects a particular cache server a proxy server. Thereafter, all requests from the user are sent to the cache server for processing. Thus, by simply adjusting the default settings on the Web browser, the user is able to redirect all requests to a selected cache server.

Nevertheless, none of the aforementioned caching systems addresses problems that is associated with an asymmetric communication channel, such as a satellite network channel or a cable television channel. For example, a message and its corresponding reply in an asymmetrical channel often experience an excessive delay. In a satellite-based system, the delay is caused by the relatively long distances associated with the communication path. In a cable network or for a remote Internet access site, the delay is often caused by the number of users occupying the system.

To address performance problems in asymmetric systems having excessive delays, systems have been proposed that parse a referencing page at a headend, or a hub, site of the system. The system then immediately downloads related links and/or objects identified by parsing and/or based on the prior user selections to a remote terminal requesting the page referencing the related links and/or objects. The downloading function is automatic for these known systems and typically occurs without receiving additional requests from a requesting terminal. See, for example, U.S. Pat. No. 5,929,850 to Broadwin et al., and WO 99/08429 invented by B. L. Carneal et al. Such automatic downloading caching systems, however, can be problematic in that the downstream bandwidth is not efficiently utilized. Unneeded data is often automatically sent to a remote terminal without being based on a specific request from the remote terminal, and when, in fact, the remote terminal requires no further data. Such automatic downloading systems also often require one or more proxy servers, thereby reducing efficiency and increasing latency based on overhead requirements that are associated with each proxy server.

What is needed is a technique for reducing the latency experienced at a remotely located station when requesting web pages and objects from a communications network, such as the Internet.

SUMMARY OF THE INVENTION

The present invention provides a technique for reducing the latency experienced at a remotely located station when requesting web pages and objects from a communications network, such as the Internet.

The advantages of the present invention are provided by a caching system and method for a satellite communications system in which a remote client station, such as a VSAT-based client station, requests a selected data page from a host station, such as a server, that is connected to a communications network, such as the Internet. According to the invention, the remote client station is coupled to the communications network through the satellite communications system. The requested data page can be a home page and/or a favorite page for the remote client station. A cache storing information forming at least a portion of at least one data page receives the request for the selected data page and determines whether at least a portion of information forming the selected data page is stored in the cache. When information forming the selected page is stored in the cache, the cache sends the information forming the selected page that is stored in the cache to the remote client station. The cache also sends a request to the host station through the satellite communications system for information forming the selected data page that is not stored in the cache. Accordingly, the cache can receive periodic updates of the information forming the base page from a server hosting the base page through, for example, a multicast transmission or through a tunnel.

In one embodiment of the present invention, the cache parses the base page and identifies objects, such as an in-line object or a dynamically-embedded object, contained in the base page. The cache then sends at least one identified object contained in the base page and that is stored in the cache to the remote client station when the at least one identified object contained the base page is stored in the cache. Subsequently, the cache sends a request to the host station through the satellite communications system for each identified object contained in the base page that is not stored in the cache. When the remote client station receives the base page and the at least one identified object from the cache, the remote client station displays the information forming the base page and the at least one identified object without delay. Alternatively, the remote client station displays the information forming the base page for a predetermined period of time before displaying the at least one identified object contained in the base page. As yet a further alternative, the cache can send the at least one identified object to the remote client station after a predetermined period of time elapses after the base page is sent to the remote client station.

As an even further alternative, the cache can include a linked list of objects stored in the cache, in which case the cache sends at least one identified object contained in the base page and that is included in the linked list of objects to the remote client station when the at least one identified object contained the linked list of objects is stored in the cache. The cache then sends a request to the host station through the satellite communications system for each identified object contained in the linked list of objects that is not stored in the cache. The cache can also send the linked list of objects to the remote client station so that the remote client station can synchronize a list of objects stored at the remote client station with the received linked list of objects stored in the cache. The cache can receive a list of objects stored at the remote client station from the remote client station so that the cache can synchronize the linked list of objects stored in the cache with the received list of objects stored at the remote client station. Additionally or in the alternative, the cache can receive information from the remote client station relating to an object handling capability of a browser operating in the remote client station. The cache can then determined which objects contained in the requested base page to send to the remote client station based on the received information relating to the object handling capability of the browser.

According to one aspect of the invention, the cache pre-fetches the requested data page and at least one object contained in the requested data page before the request for the data page is received from the remote client station. The cache can then form a data cluster from at least one object contained in the requested data page, and sends the data cluster to the remote client station. Alternatively, the cache multiplexes a plurality of objects contained in the requested data page, and/or compresses the data cluster before sending the data cluster to the remote client station.

In the situation when the selected data page includes information forming a base page, the cache can send the base page to the remote client station when information forming the base page is stored in the cache and subsequently send a request to the host station through the satellite communications system for information forming the base page that is not stored in the cache. In the situation when the remote client station stores information forming the requested data page, the cache can send information to the remote client station indicating that the requested data page stored in the remote client station does not need to be updated when information stored in the cache forming the requested data page is up to date.

The remote client station can be co-located with the cache, and/or coupled to the cache through a satellite communication link. For example, the cache can have a first portion and a second portion such that the remote client station is co-located with the first portion of the cache and is coupled to the second portion of the cache through a satellite communication link. In one embodiment of the present invention, the second portion of the cache can be connected to the communications network. In another embodiment of the present invention, the cache includes a third portion that is coupled to the communications network, and the second portion of the cache is coupled to the third portion of the cache through another satellite communication link.

The present invention also provides multicast system that has a server content evaluator and a server content cache. The server content evaluator is connected to a computer network, such as the Internet, that contains a plurality of stored pages of information each having a predetermined format, such as HTML. The server content evaluator determines whether a particular page is capable of being multicast to a plurality of client applications and assigns a unique index number to each page determined to be capable of being multicast to a plurality of client applications. The server content cache is coupled to the server content evaluator and stores index numbers that are assigned to pages of information that have been determined to be capable of being multicast to a plurality of client applications. The server content evaluator receives a request from a client application for a selected page of information over, for example, a satellite communication link, and sends the index number for the selected page to the client application when the selected page has an assigned index number stored in the server content cache. Accordingly, the server content evaluator receives the selected page of information from the computer network when the selected page of information does not have an assigned index number, determines whether the selected page is capable of being multicast to a plurality of client applications, and assigns a unique index number to the selected page when the selected page is determined to be capable of being multicast to a plurality of client applications. The server content evaluator then sends the assigned index number for the selected page to the client application.

The multicast system also includes a server multicast engine that is coupled to the server content evaluator. The server multicast engine sends the selected page of information to the client application when the server content evaluator determines that the selected page of information does not have an assigned index number, receives the selected page of information from the computer network and then assigns the unique index number to the selected page.

A client content synchronizer receives the request from the client application for the selected page of information, and sends the request for the selected page of information to the server content evaluator. Subsequently, the client content synchronizer receives the index number assigned to selected page of information from the server evaluator. A client content cache coupled to the client content synchronizer stores pages of information, such that each page of information has an assigned index number. The client content synchronizer sends the received index number for the selected page of information to the client content cache and receives the selected page of information corresponding to the received index number. The client content synchronizer then sends the selected page of information to the client application. A client multicast engine is coupled to the client multicast cache that receives the selected page of information from a server multicast engine when the selected page of information is not stored in the client content cache.

BRIEF DESCRIPTION OF THE DRAWINGS

The present invention is illustrated by way of example and not limitation in the accompanying figures in which like reference numerals indicate similar elements and in which.

DETAILED DESCRIPTION OF THE PREFERRED EMBODIMENT

Figure 1A:
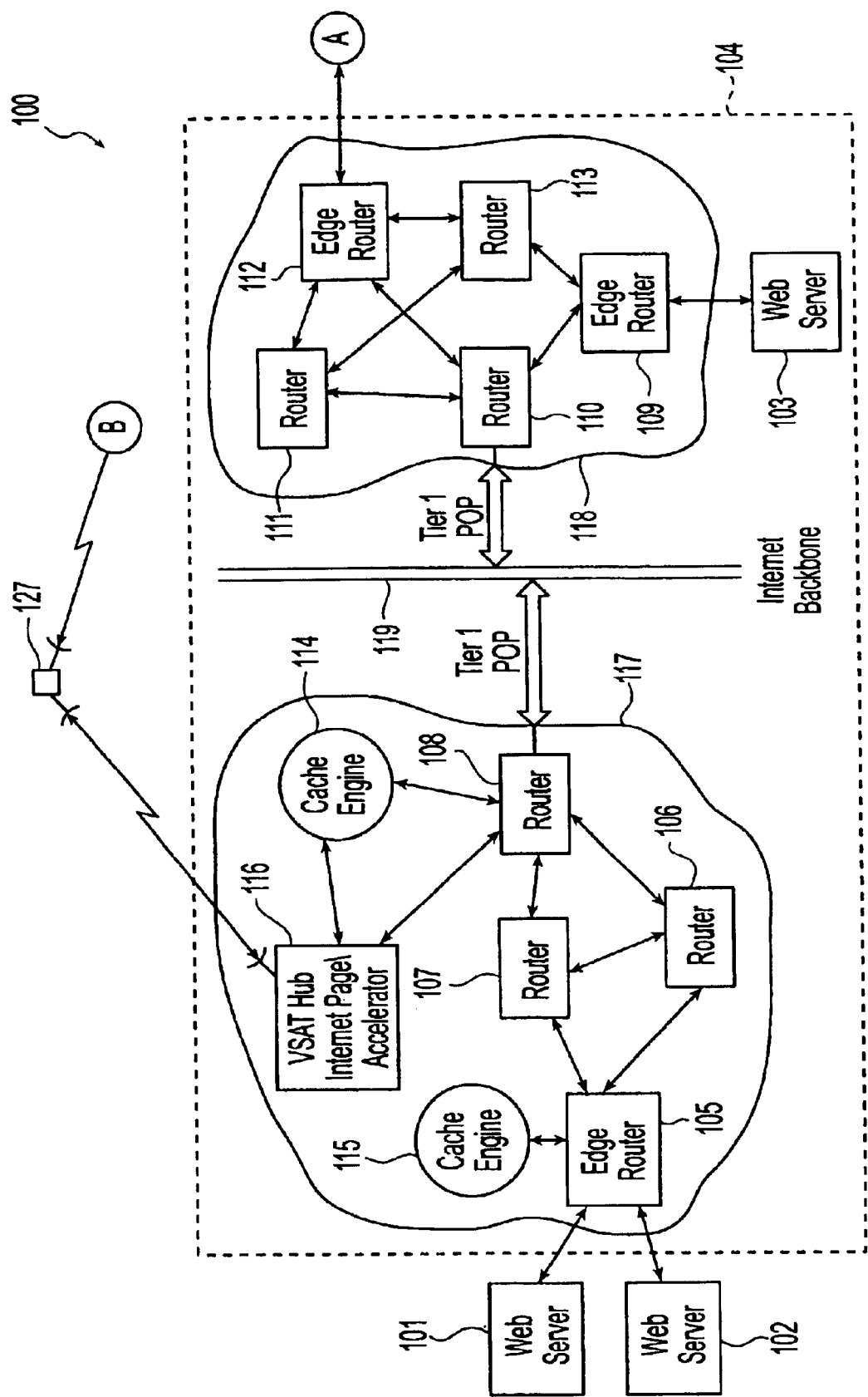
FIGS. 1A and 1B are schematic block diagrams of a broadband communications network incorporating the present invention.
Figure 1B:
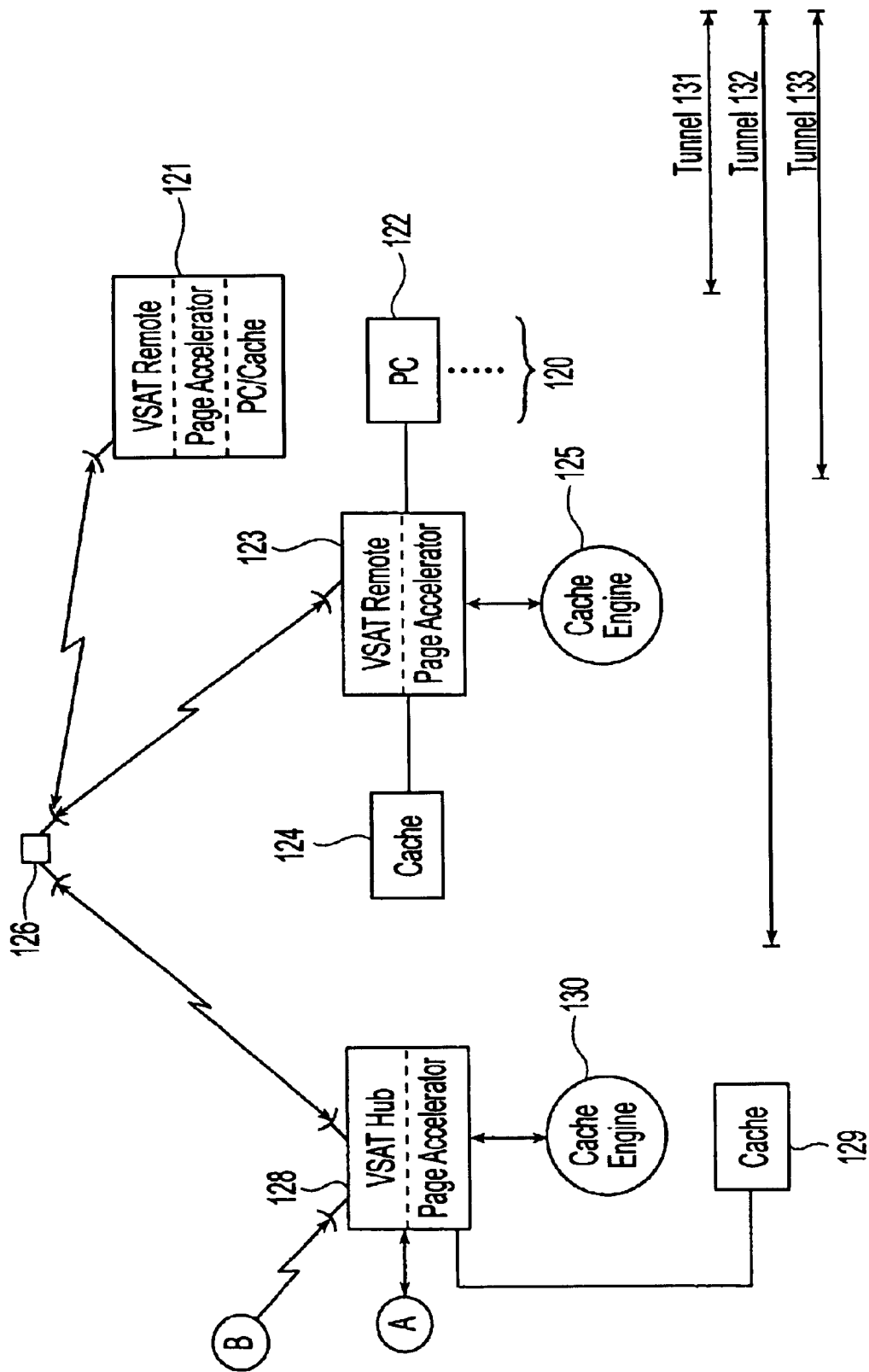

FIGS. 1A and 1B show a schematic block diagrams of broadband communications network 100 in which the present invention can be utilized. Broadband communications network 100 includes a plurality of Web servers 101, 102 and 103 that are coupled together via a telecommunications or computer network 104, such as the Internet (Web). Web servers 101, 102 and 103 operate in a well-known manner as host devices that store information, such as Web or data pages.

Telecommunications network 104, when embodied as the Internet, can include a plurality of routers 105–113, a plurality of cache engines 114 and 115, and one or more Very Small Aperture Terminal (VSAT) hubs 116. Routers 105–113 can be clustered in a plurality of sub-networks 117 and 118 that are interconnected via an Internet Backbone 119. Sub-networks that are connected directly to Internet backbone 119 are commonly referred to as Tier 1 point-of-presence (POP) networks. While only servers 101–103, routers 105–113, cache engines 114 and 115, VSAT hub 116 and subnetworks 117 and 118 are shown in FIGS. 1A and 1B as part of communications network 100, it should be understood that more or fewer of each component can be part of communications network 100.

Telecommunications network 104 is interconnected to a plurality of remotely-located stations, or terminals, 120, such as a VSAT-enabled personal computer (PC-VSAT) 121 and/or a PC 122 that is coupled to telecommunications network 104 through one or more remote VSAT stations 123. Remote VSAT station 123 can include an integral cache 124 and/or a cache engine 125 containing a cache. Remote stations 120 can be coupled to Web servers 101–103 through one or more satellites 126 and 127, and one or more VSAT hubs 128. VSAT hub 128 can include an integral cache 129 and/or cache engine 130 containing a cache. While only remote stations 121 and 122, satellites 126 and 127, and VSAT hub 128 are shown in FIGS. 1A and 1B as part of communications network 100, it should be understood that more or fewer of each component can be part of communications network 100.

In operation, requests for specific data are made by remote stations 120 and sent to various Web servers throughout telecommunications network 104. Typically, the "round trip" latency between the time that a request is made (i.e., sent) and the time that a reply to the request is perceived by a user is a minimum of 500 ms, plus any time delay experienced for both the request and reply to traverse telecommunications network 104 (i.e., the Internet). In reality, the delays in traversing Internet 104 can be substantial, particularly through the middle portion of Internet backbone 119, which carries the majority of the Internet traffic. The latency experienced at a remotely-located station 120 is particularly acute. Moreover, the latency is compounded because a typical web page can contain, for example, 10 to 80 objects that each must be retrieved. Accordingly, each object is sequentially requested across the satellite link (i.e., through satellite 126), thereby leading to a significant delay as each object is retrieved. Even when multiple connections (e.g., two to four) are opened, the latency between request and reply can still be uncomfortably long for a user.

The present invention balances speed requirements for reduced latency with network efficiency, thereby achieving a pleasant user experience without filling the capacity of a satellite downlink channel with unnecessary data. For example, when a new web page is requested by a remote station 120, the present invention queries a local cache storage for the base page of the requested web page. Such a local cache storage can be contained with the requesting remote station and/or a cache 124 and/or 125 located in remote VSAT station 123. In situations when the requested base page has been stored in a local cache, the base page can be immediately retrieved for the remote station. Accordingly, the local cache storage can be automatically periodically updated by, for example, cache engine 129 using any suitable protocol, such as Internet Cache Protocol (ICP). The ICP can be modified so that data is received from VSAT-coupled cache servers, such as cache engine 129, is compatible with the IP multicast protocol. The ICP can also be modified for allowing remote stations 120 and/or VSAT hub 128 to specify home pages and/or favorite pages. The base page can also be extracted directly from the home page location within a browser located on a remote stations 120. Favorite pages can also be identified based on a statistical determination of accessed pages, or on a frequency that a page is accessed.

According to one aspect of the invention, when a base page is located in cache storage in a remote station 120, the cached page is parsed for identifying any in-line objects contained in the page. Alternatively, a local cache storage can also contain a linked list of in-line objects that are associated with particular base pages and that are also stored in the local cache. When a requested page is determined not to have objects contained in the linked list, the base page of the requested page is parsed for generating a list of objects that are referenced within the base page. Thereafter, the local cache in a remote station 120 can be checked for determining whether the in-line objects are present. When the local objects are also present, the base page can continue loading normally.

In situations when a base page is present in a cache locally at a remote station 120, but the objects within the base page are not, the remote station sends a modified GET message to VSAT hub 128 indicating which particular page is being accessed by the remote station. Cache engine 129 at VSAT hub 128 then pre-loads objects associated with the requested base page by parsing the base page for identifying any objects associated with the base page, and issues a request for the associated objects. Rather than sending all objects or parts of the objects to the remote station as the objects are received at VSAT hub 128, VSAT hub 128 can optionally be configured to compile the received objects into a multiplexed data cluster that can, in turn, be compressed. After the remote station has loaded all or part of the base page, the remote station sends a GET request to VSAT hub 128 for requesting the multiplexed data cluster of objects. VSAT hub 128 then sends the multiplexed data cluster to the remote station where the compressed data cluster is decompressed and/or demultiplexed into the individual objects for use by the base page.

Loading of all or part of a base page prior to requesting the objects associated with the base page has the advantage that a user is allowed to halt the request before large amounts of data objects associated with the base page are transmitted over, for example, satellite 126. According to one aspect of the present invention, portions of the text of a base page can be displayed for a fraction of a second before the objects associated with the base page are automatically requested, thereby allowing high-speed browsing without filling the satellite link with large objects, such as picture, video, and/or audio files, that are associated with the base page. Another aspect of the present invention provides that index markers from VSAT hub 128 to a remote station that indicate to the local cache storage of the remote station that contents stored in the local cache are indeed up-to-date and no new data is required to be downloaded.

When one or more Web pages and/or associated objects, such as Microsoft™, Yahoo™ and/or Netscape™ home pages, are frequently requested by a plurality of terminal stations, the present invention updates caches associated with a plurality of terminal devices using, for example, multicast protocols that allow for efficient transmission of cache data over a satellite network. Details of a multicast transmission system in accordance with the present invention will be described below.

When a local cache in a remote station 120 does not include a requested page and the objects associated with the requested page, normally a request is then made to Internet 104 for retrieving the necessary data. A request for a domain name server (DNS) look-up can be made from a remote station 120 to VSAT hub 128. According to the invention, VSAT hub 128 can optionally store a version of the DNS tables in cache engine 129 to immediately return the IP address for the desired web server to the requesting remote station 120. When a locally stored DNS table is available at VSAT hub 128, an immediate look-up is executed. When a DNS table is located remotely from VSAT hub 128, VSAT hub 128 requests the IP address of the desired Web server from the remotely located DNS (not shown in FIGS. 1A and 1B in a well-known manner. In either event, VSAT hub 128 initiates the request for the desired web page directly to the retrieved IP address for obtaining and returning the base page to the requesting remote station. Thus, the delay of transmitting the IP address across the satellite from the remote station and receiving the request back is substantially reduced.

For example, VSAT hub 128 retrieves a desired base page from a Web server, such as Web server 10. The base page is then transmitted directly to the requesting remote station 120, while being processed by VSAT hub 128. That is, the received base page is parsed at VSAT hub 128 and/or compiled for identifying any objects associated with the base page. Identified objects are subsequently requested directly by VSAT hub 128, thereby avoiding any delays associated with satellite link 126. VSAT hub 128 then assembles the objects for transmission to remote station 120. Meanwhile, at the remote station 120, the base page is partially and/or completely loaded. Optionally, portions of the text of a base page can be displayed for a fraction of a second before the objects associated with the base page are automatically requested, as described above. When the downloading of the page is not aborted, a request is made to VSAT hub 128 to return a multiplexed data cluster of objects assembled at VSAT hub 128. In this manner, the satellite link between remote station 120 and VSAT hub 128 is not congested with numerous large objects that are often not wanted by a user. Alternatively, aborting the downloading of a page can generate a special user request that is forwarded to VSAT hub 128 so that the objects associated with the aborted page are prevented from being forwarded to remote station 120, thereby preventing link congestion.

Alternatively, in situations when it is difficult or inconvenient to determine when a user has actually viewed all or a portion of the base page, the present invention waits a predetermined period of time, such as 300 ms, before a remote station 120 automatically requests the objects associated with a requested page from VSAT hub 128.

When VSAT hub 128 parses a base page, VSAT hub 128 can communicate to and/or receive from remote station 120 a list of all objects requested. Consequently, when the objects are different, VSAT hub 128 can request any additional objects or discard any objects that are not likely to be utilized. For example, the Web browser on a remote station 120 can be configured with additional software for a new type of Java language or file format. Consequently, the Web browser on the remote station can require more objects than anticipated by VSAT hub 128. Alternatively, a remote station 120 can include outdated software that cannot process as many objects that have been automatically requested by VSAT hub 128. In either situation, it is often desirable for VSAT hub 128 and remote station 120 to synchronize their object requests prior to utilizing the downlink bandwidth of the satellite filling requests for objects. This is equally applicable when some, but not all, of the objects are available in a local cache at a remote station 120. Accordingly, it can be desirable for VSAT hub 128 to wait until a specific request for objects (i.e., in the form of an object list) is received from remote station 120 before forwarding objects to remote station 120.

Conventional cache engines only parse the base page looking for in-line objects, such as data files and other page links. This type of parsing, however, is not efficient for current Web pages, which can contain relatively sophisticated objects, such as dynamically-embedded objects. Accordingly, it is often necessary to compile the Web page for determining the presence of more sophisticated objects. For example, the present invention can include a Java compiler that is associated with base page parsing and/or a cache for identifying dynamically-embedded objects, thereby providing significant speed enhancements over conventional cache engines. Additionally and/or alternatively, the present invention can parse other types of dynamic web pages, such as Excel™ files, for identifying dynamic objects contained therein.

Alternatively, a hub-based caching mechanism of the present invention can use the Web response for identifying the cache contents. (In contrast, conventional techniques for identifying objects associated with a requested base page are based on a Web request.) The alternative approach of parsing a Web response increases the probability of a cache "hit" at the hub cache engine, as well as at the remote cache engine. Although additional traffic is generated between VSAT hub 128 and Internet web servers by this alternative approach, the data transmitted from VSAT hub 128 to a remote station 120 can be significantly reduced, thereby increasing the efficiency of the satellite link.

Yet another aspect of the invention utilizes tunneling between various locations within communications network 100 to further reduce latency associated with multiple open connections. Tunneling allows a process running at a remote station 120 to communicate directly with a process located remotely from remote station 120, such as to a process on the other side of a satellite link. For example, as shown in FIGS. 1A and 1B, a tunnel 131 can be formed between a remote station 120 and a VSAT hub 128. Similarly, a tunnel 132 can be formed between a remote station 120 and one or more web servers, such as server 102, located anywhere within telecommunications network (Internet) 104. Further, a tunnel 133 can be formed between a remote station 120 and/or one or more servers, such as server 103, within a selected sub-network, such as sub-network 118, that form a point of presence (POP) with telecommunications network (Internet) 104. Tunnel 133 provides the advantage of avoiding latency associated with the most congested part of the Internet, such as the Internet backbone 43. Tunneling also allows encrypting in a well-known manner for transferring sensitive data over the entire path of the tunnel. Moreover, the tunneling aspect of the invention can be used in a communication network that does not utilize a satellite link.

Various Web servers, routers, cache engines, and hubs can be configured to contain a page accelerator process that parses a base page request from a remote station 120 and assembles a multiplexed data cluster of objects for the requested base page. For example, a page accelerator process can be located within VSAT hub 116. Objects associated with a requested base page that are forwarded to VSAT hub 116, assembled and distributed to the requesting remote station 120. The transmission across the satellite link can be via multicasting, thereby reducing latency based on establishing a connection. Page acceleration, according to the present invention, is particularly effective when the system multiplexes multiple objects into clusters and forwards the clusters in bulk.

When a favorite page or home page update is implemented, the home page or favorite page can be updated on a periodic basis. Alternatively, a local cache engine associated with the home or favorite page can be queries for determining whether the page has been updated. Any update can be replicated to any cache; such as cache 129 associated with VSAT hub 128 and/or any cache associated with remote stations 120, such as cache 124.

Alternatively, the present invention provides that a persistent TCP connection can be formed between applications so that there is no need to open and close connections associated with each object, thereby reducing latency. This aspect of the present invention is particularly useful across a satellite link or in areas experiencing long delay, such as across Internet backbone 119 to remote network sites.

Additionally, latency can be further reduced by utilizing eliminating the need to send acknowledgements across satellites 126 and/or 127. For example, a TCP spoofing mechanism can be utilized for allowing local closing of connections by locally providing finish and acknowledge communication commands, thus substantially reducing latency time associated with TCP acknowledgements and eliminating the need for synchronizing or acknowledging connections across the satellite link.

When objects are parsed that are associated with multiple Web servers, a further enhancement for reducing latency is to assemble the object requests into separate lists associated with each Web server and then to forward the requests separately. This is particularly useful when Web bypass links, such as through satellite 127, are utilized for speeding the process of accessing remote portions of communications network 100.

A VSAT hub, such as VSAT hubs 116 and 128, can also store cookies that are associated with the respective servers accessed by a remote station 120 so that there is no requirement for the remote station 120 to send a lengthy cookie with a "GET" request for a new web address. Further, such a VSAT hub that stores cookies for a remote station has the information contained in the cookie that can be used when parsing and/or compiling a requested base page.

As yet a further enhancement of the present invention, a list of objects associated with a requested base page can be determined at a location that is "remote" from a remote station 120, such as remote VSAT hub 116. Alternatively, a VSAT hub, such as VSAT hub 128, can determine the list of objects associated with a requested base page and forward the list to another VSAT hub, such as VSAT hub 117. VSAT hub 117 then contacts the appropriate Web server (i.e., Web server 101) and requests all objects contained in the list. VSAT hub 117 then assembles a multiplexed data cluster of objects received from the Web server at a relatively high rate of speed with a corresponding reduced latency because of the proximity of VSAT hub 117 to Web server 101. The multiplexed data cluster generated by VSAT hub 117 (compressed or uncompressed) is then be forwarded via satellite 127 back to VSAT hub 128, thereby eliminating delays associated with Internet backbone 119.

As previously noted, the various embodiments of the present invention can include a multicast transmission system for transmitting the same data to multiple clients simultaneously. Such a multicast system is useful for transmitting information that is frequently accessed by remote stations 120, such as the Microsoft™, Yahoo™ and Netscape™ home pages. The multicast transmission system can also be used, for example, for transmitting "non-optional" advertisement handlings and for integrating customized training information with other available external content.

Figure 2:
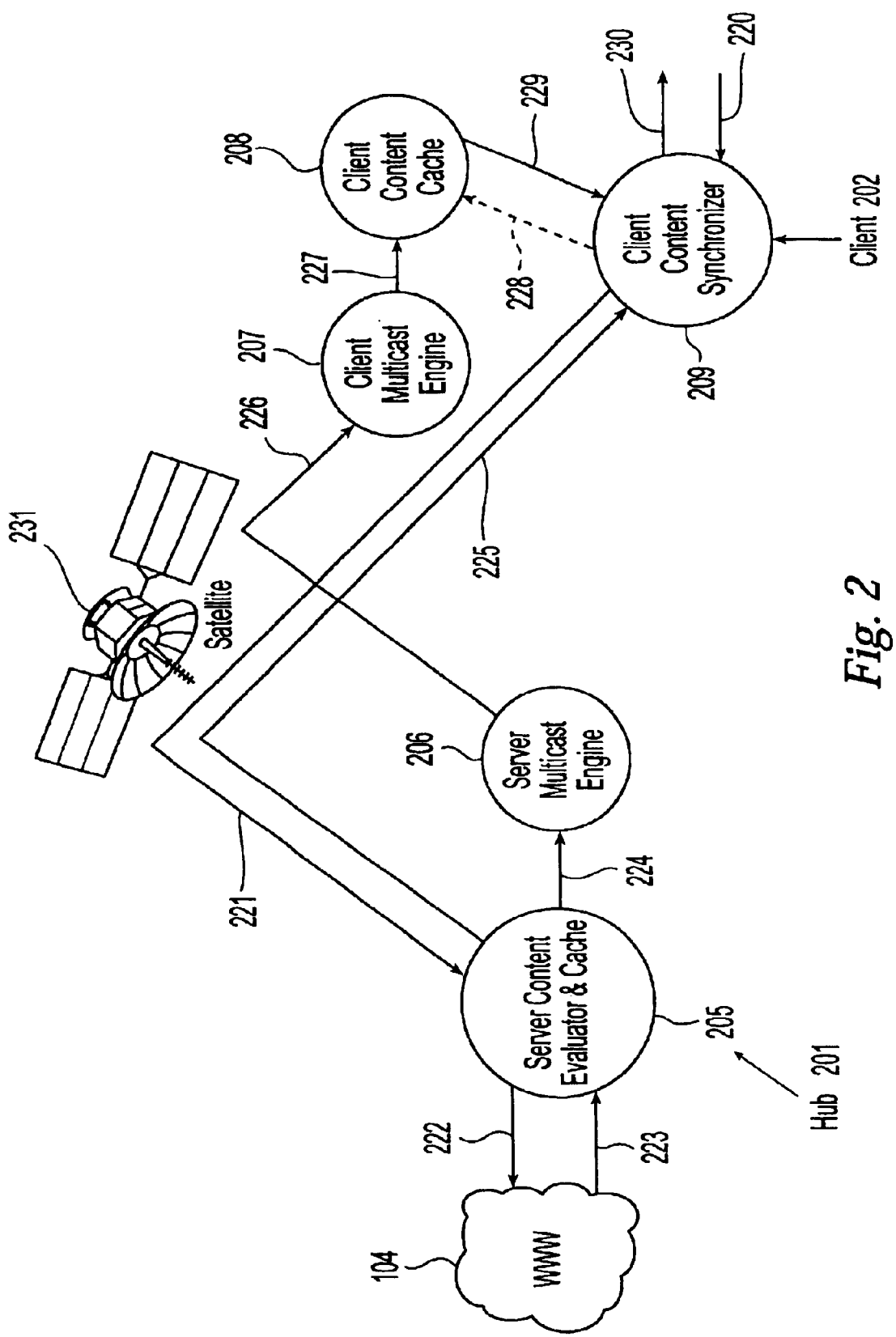
FIG. 2 is a schematic block diagram of a portion of the broadband communications network shown in FIGS. 1A and 1B that provides a satellite-based real-time HTML multicast system according to the present invention.

FIG. 2 is a schematic block diagram of a portion of broadband communications network 100 (FIGS. 1A and 1B) that provides a satellite-based real-time HTML multicast system 200 according to the present invention. For simplicity, FIG. 2 shows only the functional blocks of the multicast transmission system of the present invention. System 200 includes a hub or server node 201 and a plurality of client nodes 202, although only a single client node 202 is shown in FIG. 2. Hub node 201 is connected to telecommunications network 104 (FIGS. 1A and 1B), such as the Internet (WWW). Alternatively, telecommunications network 104 can also be a local area network (LAN) or a wide area network (WAN) that, in turn, is connected to the Internet. Telecommunications network 104 includes information that is preferably stored in the form of hypertext mark-up.

In one embodiment of the multicast system of the present invention, hub node 201 corresponds to, for example, VSAT hub 117, and client node 202 corresponds to, for example, VSAT hub 128. In another embodiment of the multicast system of the present invention, hub node 201 corresponds to, for example, VSAT hub 117, and client node 202 corresponds to, for example, remote VSAT station 123. In yet another embodiment of the multicast system of the present invention, hub node 201 corresponds to, for example, VSAT hub 117, and client node 202 corresponds to, for example, remote VSAT station 121. Of course, while only a single satellite 231 is shown in FIG. 2, it should be understood that system 200 could include a plurality of satellites forming the satellite network. Moreover, it should be understood that system 200 could include a plurality of hub nodes 201 connected to one or more telecommunications networks 104. Further, system 200 can include a plurality of client hubs 202.

Hub node 201 includes a Server Content Evaluator and Cache 205 (i.e., cache 114 in FIGS. 1A and 1B), and a Multicast Engine 206. Server Content Evaluator and Cache 205 is connected to telecommunications network 104 to operatively receive and send communications messages from/to telecommunications network 104 in a well-known manner. Server Multicast Engine 206 is connected to Server Content Evaluator and Cache 205.

Client node 202 includes a Client Multicast Engine 207, a Client Content Cache 208 (i.e., cache 124 in FIGS. 1A and 1B) and a Client Content Synchronizer 209. Client Multicast Engine 207 is communicatively coupled in a well-known manner to Server Multicast Engine 206 through satellite 231. Additionally, Client Multicast Engine 207 is coupled to Client Content Cache 208. Client Content Synchronizer 209 is communicatively coupled in a well-known manner to Server Content Evaluator and Cache 205 through satellite 231. Client Content Synchronizer 209 is also coupled to Client Content Cache 208, and to at least one client application that is executing at, for example, a remote station 120 (FIGS. 1A and 1B).

At hub node 202, Server Content Evaluator and Cache 205 evaluates the contents of unique HTML pages on a real-time basis and marks those particular pages that are capable of being multicast to multiple clients. The same information content can be usually accessed using multiple HTTP path names, which are also known as URLs. Server Content Evaluator and Cache 205 also uniquely identifies each of page having unique content and that is capable of being multicast using an index number for synchronizing communication between itself and client applications. A plurality of the unique base pages and unique objects associated with the base pages are stored in the cache portion of Server Content Evaluator and Cache 205.

Server Multicast Engine 206 is responsible for multicasting any data together with the corresponding index numbers identifying the data to the clients. Server Multicast Engine 206 is capable of sending the data contents in either a simplex (i.e., no acknowledgment from a client) or a duplex mode (i.e., negative acknowledgments from a client).

Client Multicast Engine 207 receives multicast data and forwards received data to Client Content Cache 208. Client Content Cache 208 stores the unique HTML contents of selected pages of information along with the corresponding assigned index numbers for the selected pages.

Client Content Synchronizer 209 evaluates requests received from a client application 210, such as a browser located at a remote station 120, communicates with Server Content Evaluator and Cache 205, and derives a specific multicast item that is to be forwarded to client application 210. In the situation that a requested data item, i.e., base page or object, does not exist in Client Content Cache 208, Server Content Evaluator and Cache 205 obtains the requested data item from telecommunications network 104. Through a multicast mechanism, preferably through satellite 231, Server Content Evaluator and Cache 205 forwards the requested data item to Client Content Cache 208. Client Content Synchronizer 209 also multiplexes multiple client requests and compresses the requests before forwarding to the Server side 201 of the system, thereby providing inbound bandwidth efficiency.

Data flow for the present invention is as follows: A request for a selected data item, such as an HTML page, is received at 220 in FIG. 2 by Client Content Synchronizer 209 from a client application located within a remote station 120. At 221, Client Content Synchronizer 209 forwards the request for the data item (in a modified form, if appropriate) to Server Content Evaluator and Cache 205 through satellite 231. When Client Content Synchronizer 209 has received multiple requests for HTML data, a received request is preferably multiplexed and compressed with other requests received by Client Content Synchronizer 209, thereby providing inbound bandwidth efficiency at Server Content Evaluator and Cache 205. Server Content Evaluator and Cache 205 examines the content data stored in cache for the requested data item. A multiplexer portion of Client Content Synchronizer 209 schedules satellite inbound responses to the requests, thereby synchronizing bandwidth utilization.

When the requested data item is not stored in cache at hub node 201, Server Content Evaluator and Cache 205 requests the information from telecommunications network 104 in a well-known manner at 222, such as using a standard HTML request. The requested data item is returned at 223, preferably in the form of a standard HTML response, either directly or redirected automatically from telecommunications network 104. At 224, Server Content Evaluator and Cache 205 identifies the received response using a unique index number, and forwards the received response to Server Multicast Engine 206. At 225, Server Content Evaluator and Cache 205 sends the index number corresponding to the requested data item. At 226, Server Multicast Engine 206 multicasts the requested data item and the corresponding index number for the requested data item to Client Multicast Engine 207. At 227, all multicast contents received by Client Multicast Engine 207 are forwarded to and saved by Client Content Cache 208. At 228, Client Content Synchronizer 209 requests the content of the requested data item from Client Content Cache 208 using the index identifier received from Server Content Evaluator and Cache 205. At 229, Client Content Cache 208 returns the content of the requested data item to Client Content Synchronizer 209. At 230, Client Content Synchronizer forwards the content of the requested data item to the requesting client application.

When the requested data item is found to be stored in cache at hub node 201, Server Content Evaluator and Cache 205 sends a message to Client Content Synchronizer 209 at 225 indicating the index number for the requested data item stored in Client Content Cache 208. At 228, Client Content Synchronizer 209 requests the content of the requested data item from Client Content Cache 208 using the index identifier received from Server Content Evaluator and Cache 205. At 229, Client Content Cache 208 returns the content of the requested data item to Client Content Synchronizer 209. At 230, Client Content Synchronizer forwards the content of the requested data item to the requesting client application.

Figure 3:
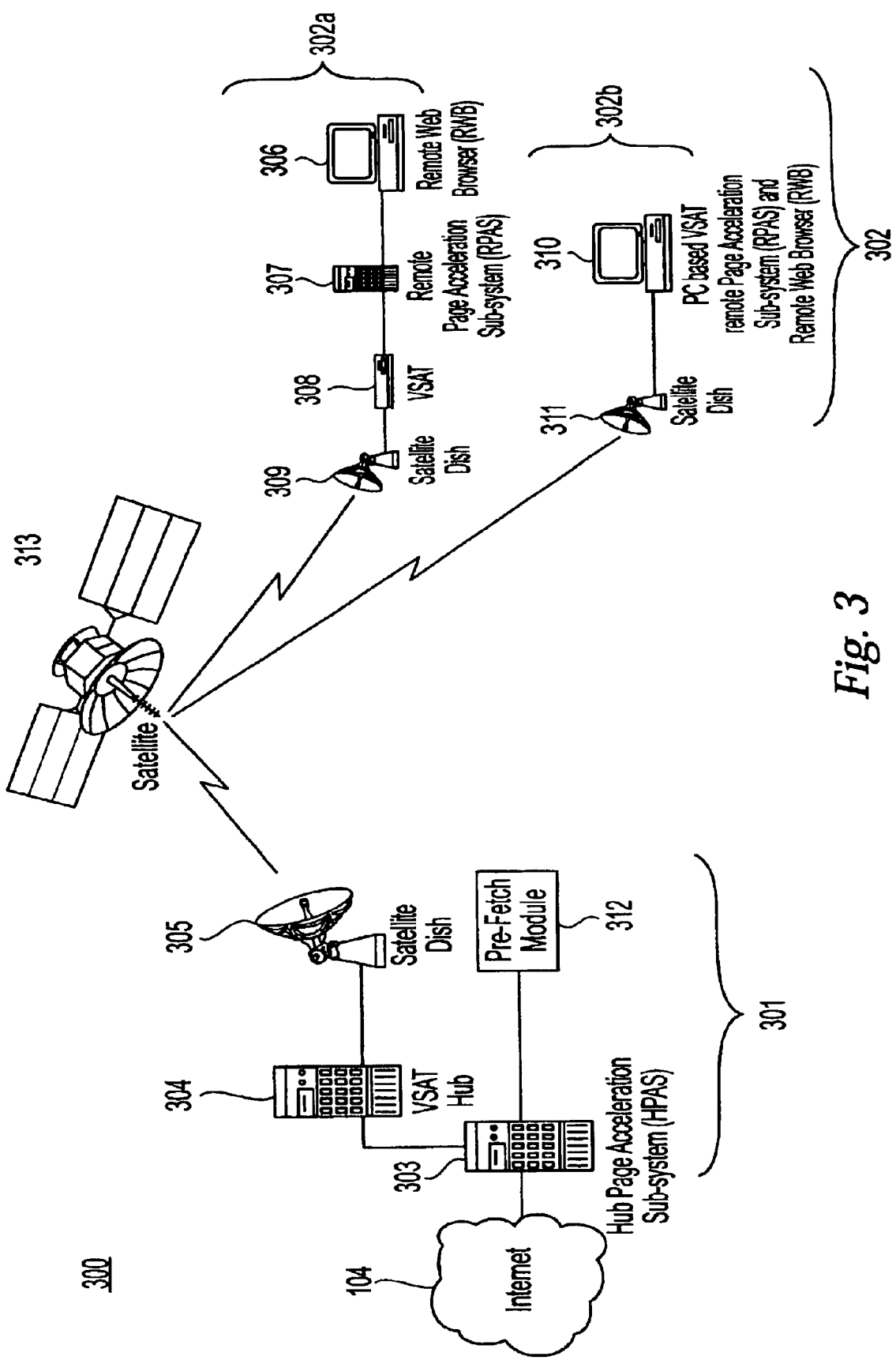

FIG. 3 is a schematic block diagram of a portion of broadband conmiunications network 100 (FIGS. 1A and 1B) that provides a page accelerating system 300 according to the present invention. For simplicity, FIG. 3 shows only the functional blocks of the page accelerating system of the present invention. Page accelerator system 300 includes a hub or server node portion 301 and at least one client node portion 302. Hub node portion 301 is connected to telecommunications network 104 (FIGS. 1A and 1B), again, such as the Internet (WWW). Alternatively, telecommunications network 104 can also be a local area network (LAN) or a wide area network (WAN) that, in turn, is connected to the Internet. Once again, telecommunications network 104 includes information that is preferably stored in the form of hypertext mark-up language (HTML) pages. Hub node portion 301 is communicatively coupled to each client node portion 302 over a satellite communication link utilizing a satellite 313 of a satellite network in a well-known manner.

In one embodiment of the page accelerator system of the present invention, hub node portion 301 is located at, for example, VSAT hub 117, and client node portion 302 is located at, for example, VSAT hub 128. In another embodiment of the accelerator system of the present invention, hub node portion 301 is located at, for example, VSAT hub 117, and client node portion 302 is located at, for example, remote VSAT station 123. In yet another embodiment of the page accelerator system multicast system of the present invention, hub node 201 corresponds to, for example, VSAT hub 117, and client node 202 corresponds to, for example, remote VSAT station 121. Of course, while only a single satellite 313 is shown in FIG. 3, it should be understood that system 300 could include a plurality of satellites forming the satellite network. Moreover, it should be understood that system 300 could include a plurality of hub node portions 301 connected to one or more telecommunications networks 104. Further, system 300 can include a plurality of client hub portions 302.

Hub node portion 301 includes a Hub Tunnel Agent 303 (also referred to herein as Hub Page Acceleration Subsystem (HPAS)), a VSAT Hub 304 and a central satellite dish antenna 305. Hub Tunnel Agent 303 is connected to telecommunications network 104 to operatively receive and send communications messages from/to telecommunications network 104 in a well-known manner. Hub Tunnel Agent 303 is connected to VSAT Hub 304, and VSAT hub 304, in turn, is connected to central satellite dish antenna 305.

According to one exemplary embodiment of the present invention, a client hub portion 302 includes a personal computer 306 (also referred to herein as a Remote Web Browser (RWB)), a Remote Tunnel Agent (RTA) 307 (also referred to herein as a Remote Page Acceleration Subsystem (RPAS)), a VSAT 308 and a remote satellite dish antenna 309. This exemplary embodiment corresponds to PC 122 and remote VSAT station 123 shown in FIGS. 1A and 1B. According to another exemplary embodiment of the present invention, a client hub portion 302 includes a PC-VSAT-RTA 310 having an integrated RTA and an RWB, and a remote satellite dish antenna 311. This second exemplary embodiment corresponds to PC-VSAT 121 shown in FIGS. 1A and 1B.

VSAT 308 and PC-VSAT-RTA 310 communicate with VSAT Hub 304 via remote satellite dish antennas 309 and 311, respectively, satellite 313, and central satellite dish antenna 305. VSAT Hub 305 connects to telecommunications network 104 (i.e., the Internet) via HTA 303, and allows a user to perform activities on the Internet, such as Internet browsing, using the hypertext transfer protocol (HTTP).

Page accelerator system 300 of the present invention provides two benefits. First, the requirement that a TCP connection must be established over the satellite link between the client on a PC 306 (or a PC-VSAT-RTA 310), i.e., the user's remote web browser or RWB, and a desired web server within the Internet is eliminated. Second, page accelerator system 300 provides the necessary hardware for page accelerator software.

As previously described, before an RWB can send an HTTP GET request for a page, a connection between the RWB and the appropriate web server must be established. When the web page contains objects from different web servers (as is very common for advertisements and for web server load distribution), at least one connection will be established to each different web server, each of which can take over 600 ms by satellite. By using RTA 307 at VSAT 308 and a HTA 303 at VSAT Hub 304, however, a majority of all connections can be made locally with the relevant RTA and HTA. That is, the RWB in remote PC 306 is connected to RTA 305 at the remote VSAT location, and the web server located within the Internet (telecommunications network 104) is connected to HTA 303 at VSAT Hub 304. Subsystems 303 and 307 then maintain a permanent connection (i.e., persistent connection) between each other that carries all the traffic between PC 306 and the desired web server.

Figure 4:
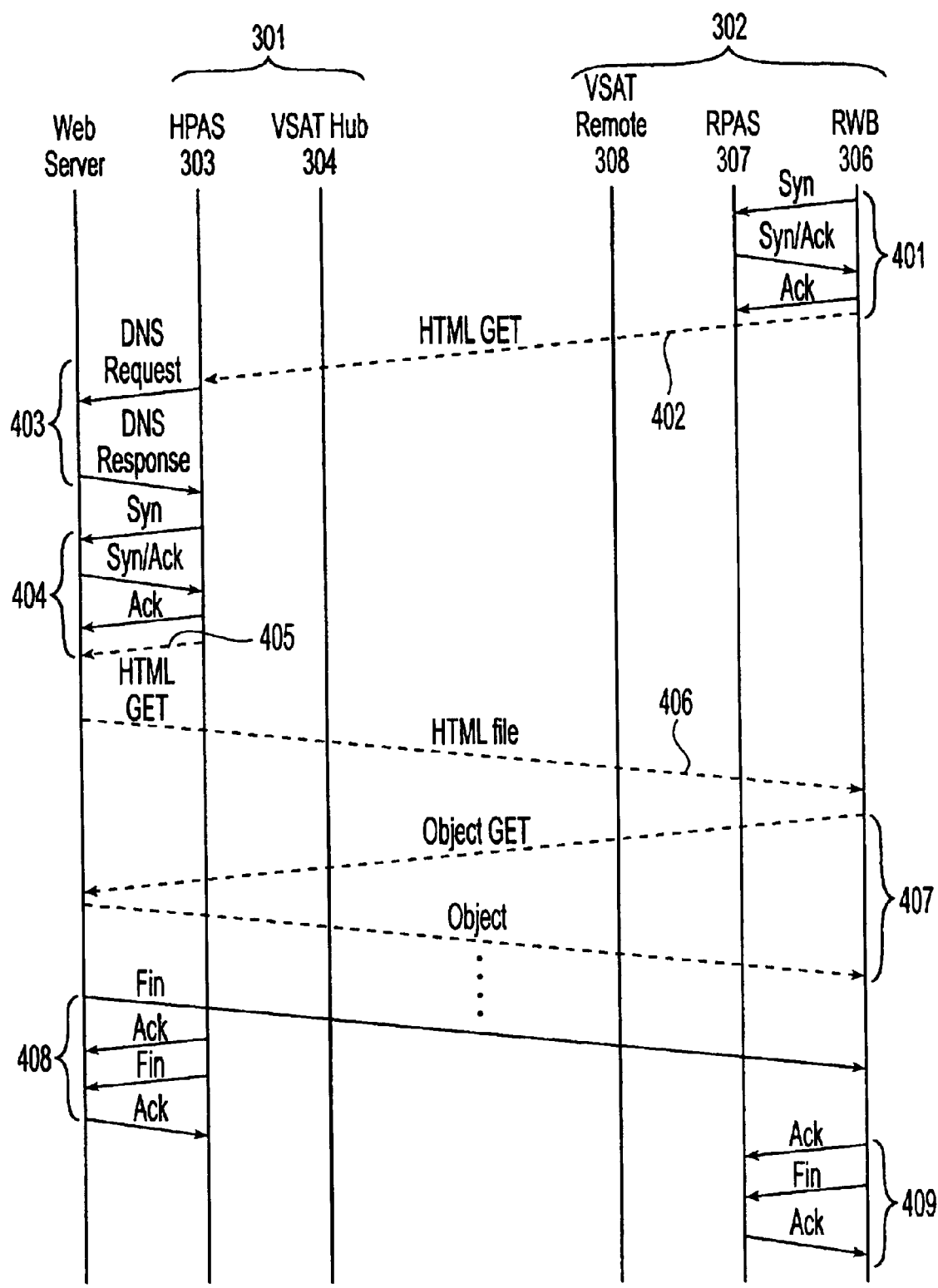
FIG. 4 shows a simplified data flow diagram for a web page access function for a VSAT network having a page accelerator system according to the present invention.

FIG. 4 shows a simplified data flow diagram for a web page access function for a VSAT network having a page accelerator system according to the present invention. As shown in FIG. 4, only application data is sent over the satellite link (assuming a TCP spoofing mechanism is used). In the absence of TCP spoofing, TCP acknowledgements are sent over the satellite link as well. Overhead traffic, such as TCP start and stop commands, are eliminated from the satellite link (with or without spoofing), thereby reducing the total response time and saving resources.

As shown in FIG. 4, access to a web page in a page accelerator system begins when an RWB in PC 306 establishes a connection with RTA 307 with Data Exchange 401. Because PC 306 "knows" the location of RTA 307, there is no need for PC 306 to make a DNS request. As with a true connection to the Internet, data exchange 410 requires at least three communications between PC 306 and RTA 307 for synchronization and acknowledgment of the connection.

After the connection is made between PC 306 and RTA 307, the RWB in, for example, PC 306 requests a desired web page using an HTML GET request at Data Exchange 402. The GET request is sent via RTA 307 to HTA 303.

HTA 303 then makes an initial DNS request for an IP address, and receives the requested IP address from the appropriate DNS server at Data Exchange 403. After the IP address is obtained, HTA 303 establishes a connection using the proper IP address at Data Exchange 404. Both data exchanges 403 and 404 are performed locally between HTA 303 and the desired web server within the Internet (telecommunications network 104). Consequently, any delay that would be experienced through satellite 313 is avoided.

After a connection is established to the desired web server, HTA 303 requests the desired web page using an HTML GET request (Data Exchange 405), and the relevant HTML base page is sent to PC 306 by the web server (Data Exchange 406). As of this point, the only two satellite delays experienced have been for the HTML GET request (Data Exchange 402) and the HTML base page (Data Exchange 406).

When the HTML base page is received by PC 306, the RWB in PC 306 begins to request the individual objects associated with the received HTML base page, and the web server sends the objects to PC 306 (Data Exchange 407). Data Exchange 407 is repeated as many times as necessary for retrieving all of the objects associated with the received HTML base page.

In one embodiment of the present invention, PC 306 requests the objects individually and, consequently, experiences a satellite delay for each request and transfer (i.e., for each Data Exchange 407). Because an average web HTML base page can contain 10 or 20 objects, a large delay can be experienced as each object is retrieved.

When all of the objects have been retrieved, RTA 303 and HTA 307 close their respective connections the web server within the Internet (telecommunications network 104) and with PC 306 through a series of finish and acknowledge communications (Data Exchange 408 and 409, respectively). Because Data Exchanges 408 and 409 are performed locally, no additional satellite delay is incurred.

According to another embodiment of the present invention, an object pre-fetching mechanism further reduces the processing time for the web requests. The object accelerating mechanism extends the functionality of system 300 by significantly reducing the inbound traffic, i.e., the traffic between VSAT Hub 204 and VSAT 306/PC-VSAT-RTA 310.

At hub node 301, a hub object pre-fetch module 312 is incorporated into HTA 303 for facilitating communication with the Internet (telecommunications network 104). All packets pass through hub object pre-fetching module 312. When an HTTP GET request arrives at VSAT Hub 304 from, for example, PC 306, VSAT Hub 304 forwards the GET request to the appropriate web server within the Internet (telecommunications network 104). When the request contains a cookie (i.e., pre-configured information relating the user that is usually saved in the remote machine), the cookie is also saved in VSAT Hub 304. When an HTML base page is delivered as a response from the Internet (telecommunications network 104) to VSAT Hub 304 via HTA 303, the HTML base page is saved in a hub memory within VSAT Hub 304, as well as forwarded to the relevant VSAT 308 via satellite 313.

HTA 303 then processes the HTML base page and begins requesting independent objects of the base page, i.e., the objects that do not interact with the web browser. Potentially dynamic objects that interact with web browsers, such as JAVA scripts and Microsoft Excel files, are handled separately, as will be explained below. After HTA 303 receives the independent objects, HTA 303 forwards the independent objects to the relevant RTA 307. When the original HTML GET request contains a cookie, all further requests from HTA 303 for HTML pages related to the cookie preferably contain the cookie, as well, for efficiently processing the object retrieval. When dynamic HTML files (i.e., written in JAVA script) are received by HTA 303, the dynamic HTML files are compiled (similar to the process that would be performed by the RWB) for providing "page" or "object" links. The objects are then retrieved by HTA 303 and forwarded to RTA 307. Microsoft Excel files are compressed by HTA 303 using existing compression schemes, forwarded, and decompressed by RTA 307 before forwarding to the RWB in PC 306.

At the remote end, an object storage module is installed within RTA 307. When an HTML base page is delivered from VSAT Hub 304, RTA 307 keeps a copy of the base page and forwards the base page to the RWB in PC 306. All of the objects that arrive from VSAT Hub 304 are also stored at RTA 308. When the RWB in PC 306 begins to parse the received HTML base page, the RWB sends requests to RTA 307 for all objects and, when found stored in RTA 307, does not contact the web server directly.

Even with the object pre-fetching mechanism of the present invention, the RWB at PC 306 must wait for a significant amount of time to receive a requested HTML base page (600 ms and the variable Internet delay). Consequently, the prefetching mechanism of the present invention can pre-fetching several base pages to RTA 307 that the RWB in PC 306 is most likely to request. RWBs have the capability for defining a "home page", or a web site that a user always accesses while using the Internet. RTA 307 identifies the home page and maintains an updated version of the base page corresponding to the home page stored in memory. Additionally, the HTA maintains a list of "favorite" pages (popular web sites), and maintains updated versions of the base pages for the favorite sites. According to the invention, the home and favorite web pages are periodically sent from HTA 303 to all RTAs (i.e., RTA 307 and PC-VSAT-RTA 310) using multicast techniques. An RTA, when receiving the favorite base pages, saves favorite base pages in memory as well. This embodiment of the pre-fetching mechanism of the present invention is referred to as "multicasting pre-fetched base pages".

When, for example, the RWB in PC 306 requests a home page or a favorite page that is already stored in the memory of RTA 307, the requested HTML base page is immediately forwarded to the RWB from RTA 307. In conjunction, as with the "pre-fetch" process, the request for the page is also forwarded to HTA 303, and is processed so that objects that are associated with the requested page are updated as described above.

Figure 5:
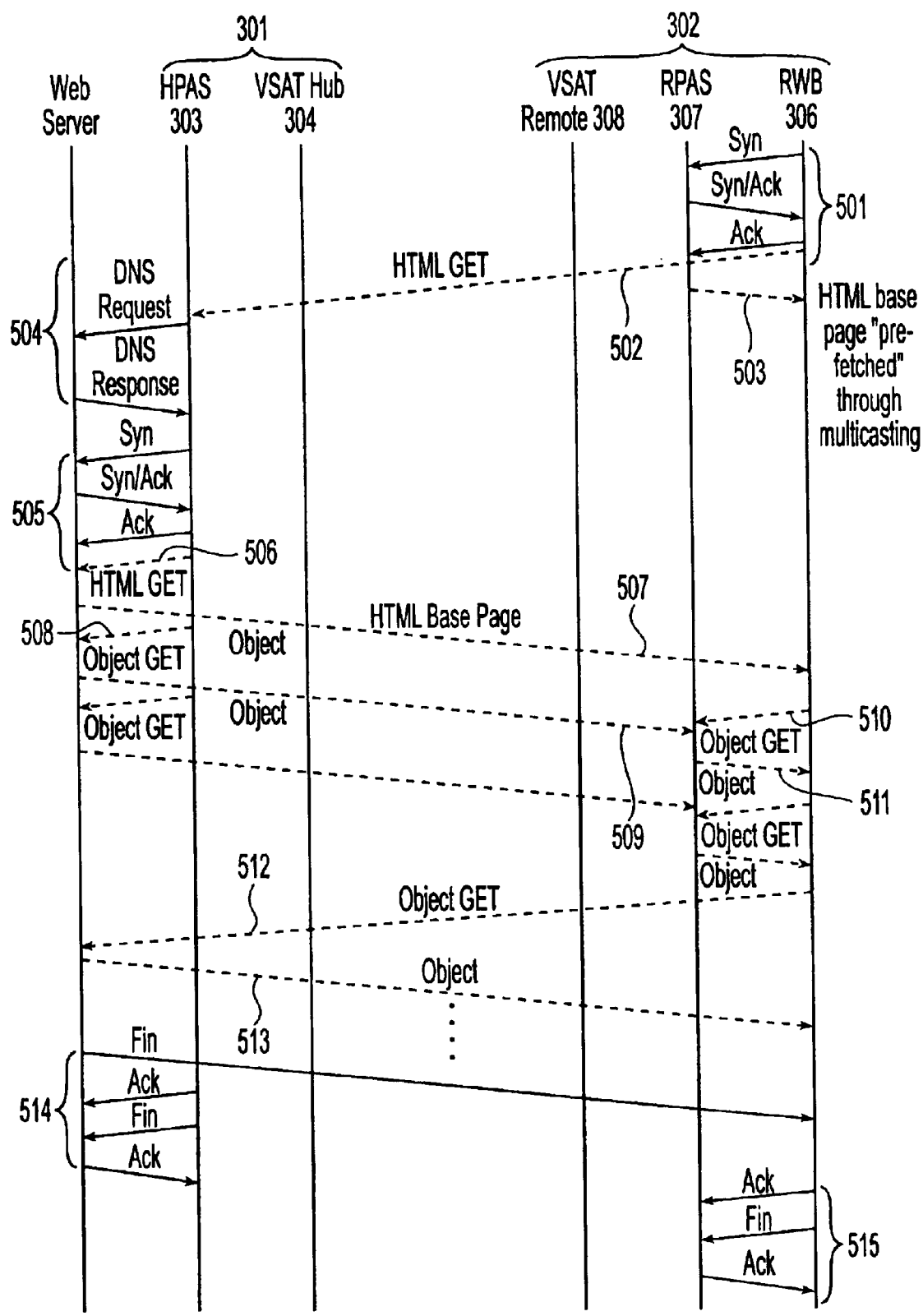
FIG. 5 shows a simplified data flow diagram for a web page access function for a VSAT network having a page acceleration system that uses object pre-fetching according to the present invention.

FIG. 5 shows a simplified data flow diagram for a web page access function for a VSAT network having a page acceleration system that uses object pre-fetching according to the present invention. As shown in FIG. 5, access to a web page by a page accelerator system having a pre-fetching mechanism according to the present invention begins when the RWB in, for example, PC 306 establishes a connection with RTA 307 at Data Exchange 501. As previously described, because PC 306 "knows" the location of RTA 307, there is no need for PC 306 to make a DNS request.

After the connection is made between PC 306 and RTA 307, the RWB in PC 306 requests a desired web page using an HTML GET request (Data Exchange 502). The GET request is sent to HTA 303 via RTA 307. When the HTML base page corresponding to the requested web page has already been provided to RTA 307 through the multicast pre-fetched base page mechanism of the present invention, the HTML base page is immediately forwarded from RTA 307 to the RWB in PC 306 at Data Exchange 503.

At Data Exchange 504, HTA 303 makes an initial DNS request for an IP address, and receives the IP address from the web server. After the IP address is obtained from the DNS server, HTA 303 establishes a connection with the proper IP address at Data Exchange 505. After a connection is established, HTA 303 requests the desired web page using an HTML GET request at Data Exchange 506, and the relevant HTML base page is sent to PC 306 by the web server via HTA 303 and RTA 307 at Data Exchange 507.

As soon as HTA 303 receives the requested HTML base page, at Data Exchange 508 HTA 303 requests the individual objects associated with the HTML base page from the Web. As each object is received, the object is immediately forwarded to RTA 307 for storage at Data Exchange 509. This step is repeated as many times as necessary for retrieving all of the objects associated with the requested HTML base page.

The RWB in PC 306, upon receiving the requested HTML base page, also begins to request the individual objects associated with the HTML base page (Data Exchange 510). This request, however, is local and is made only to RTA 307. RTA 307, in turn, determines whether the requested objects have previously been received from HTA 303. If so, RTA 307 forwards the requested objects to the RWB in PC 306 at Data Exchange 51). When the requested objects have not been previously received by RTA 307, and when RTA 307 determines that the requested objects are to be pre-fetched and forwarded by HTA 303, the RWB requests are locally stored by RTA 307 for a predetermined amount of time while RTA 307 is waiting to receive the corresponding objects from HTA 307.

In some cases, however, it can be necessary for the RWB in PC 306 to communicate directly with a web server using, for example, encrypted GET requests. In such a situation, the RWB in PC 306 sends an object request directly to the web server at Data Exchange 512, and the web server forwards the requested object back to the RWB in PC 306 at Data Exchange 513. After such a communication sequence, however, PC 306 returns to communicating with RTA 307 for normal cases.

Of course, the steps of object retrieval, whether direct or through RTA 307, are repeated by PC 306 as many times as necessary for retrieving all of the objects associated with the requested HTML base page. Because a majority of the requests made by the RWB in PC 306, however, are made locally to RTA 307, there is a minimum satellite delay experienced during the process, significantly reducing the time required for web pages to fully load.

Once all of the objects are retrieved, HTA 303 and RTA 307 close their respective connections with the web server within the Internet (telecommunications network 104) and the RWB in PC 306 through a series of finish and acknowledge communications (Data Exchanges 514 and 515, respectively). Because Data Exchanges 514 and 515 are each performed locally, the data exchanges do not result in any additional satellite delay.

Figure 6:
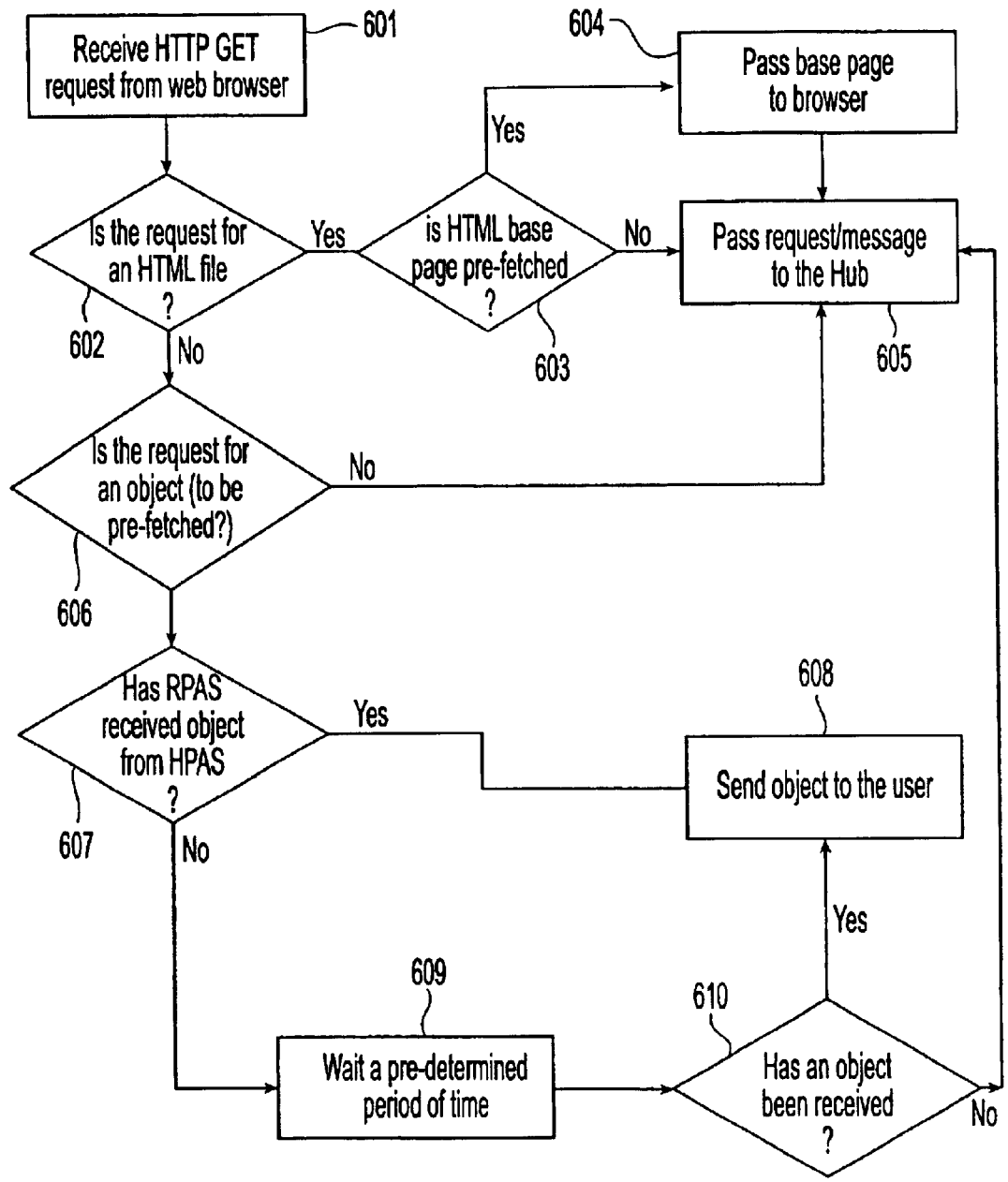
FIG. 6 is a flowchart showing a process used by an RTA for providing page acceleration according to the present invention.

FIG. 6 shows a flow diagram of a process performed when, for example, RTA 307 receives an HTTP GET request from the RWB in PC 306 (Step 601). At step 602, RTA 307 determines whether the HTTP GET request is a request for an HTML base page. If so, flow continues to step 603, where RTA 307 verifies whether a copy of the requested base page is stored in the memory of RTA 307. If, at step 603, RTA 307 determines that the requested base page is stored in the memory of RTA 307, flow continues to step 604 where RTA 307 forwards the base page to PC 306. Flow continues to step 605, where RTA 307 forwards the request to VSAT Hub 304. If, at step 603, RTA 307 determines that the requested base page is not stored in the memory of RTA 307, flow continues to step 605.

If, at step 602, RTA 307 determines that the GET request is not for an HTML file, flow continues to step 606, where RTA 307 determines whether the GET request is for an object that is to be prefetched. When the object is not a prefetched object, flow continues to step 605, where RTA 307 forwards the request to VSAT Hub 304. If, at step 606, RTA 307 determines that the requested object is a "prefetched" object, flow continues to step 607 where RTA 307 determines whether RTA 307 has already received the object from HTA 303. If so, flow continues to step 608, where RTA 307 sends the object to PC 306. If, at step 607, RTA 307 determines that the object has not yet been received from HTA 303, flow continues to step 609 where RTA 307 waits a predetermined period of time.

Upon expiration of the predetermined period of time, flow continues to step 610 where RTA 307 determines whether the object has been received. If so, flow continues to step 608, where RTA 307 sends the object to PC 306. If not, flow continues to step 605 where RTA 306 forwards the object request to VSAT Hub 304.

Table 1 shows a comparison between access time for a conventional VSAT network, for a VSAT network with a persistent connection without object pre-fetching (FIG. 4), and for a VSAT network having a complete page acceleration system according to the present invention (FIG. 5). In making the comparisons, the following assumptions have been made for simplifying the analysis.

The response time of a web server from the time VSAT Hub 304 makes a request to when the request is answered is assumed to be 100 ms. The satellite delay for passing requests and objects between hub antenna 305 and remote antenna 309 through satellite 313 is assumed to be 500 ms. The transmission time of a GET request over satellite 313 is assumed to be 60 ms. The same GET request has a transmission time of less than 5 ms between VSAT hub 304 and the web server within the Internet (telecommunications network 104). As a result, the delay experienced between VSAT hub 304 and the web server will be neglected and treated as zero. The transmission time of an object is assumed to be 40 ms.

It is assumed that the web browser opens two connections to every web server for retrieving the page objects. It is also assumed that web pages with up to 10 objects reside on a single server. For more complex pages, it is assumed that the HTML for the requested page resides on one server and all the objects reside on a different server. All are assumed to be simple, i.e., they can be pre-fetched. The TCP connection establishment delay over the LAN at the remote VSAT is negligible and is assumed to be zero. A connection establishment delay at the hub side is assumed to be 20 ms. A DNS response time is assumed to be 25 ms.

These assumptions do not take into account the uncertainty of Internet delays, web browser behavior, and web page design. Because such delays can occur regardless of whether there is a page acceleration system, they have been disregarded.

TABLE 1

A COMPARISON OF WEB ACCESS TIMES

| No. of Objects | Conventional VSAT System | | Page Acceleration without Pre-fetch | | Page Acceleration with Pre-Fetch | |
| --- | --- | --- | --- | --- | --- | --- |
| | Seconds | No. Requests | Seconds | No. Request | Seconds | No. Request |
| 1 | 2.6 | 7 | 1.5 | 2 | 0.9 | 1 |
| 10 | 6.1 | 20 | 5 | 11 | 1.6 | 1 |
| 20 | 10.8 | 36 | 8.5 | 21 | 2.4 | 1 |

The 'Seconds' in Table 1 refers to the expected amount of time for a web page having the indicated number of objects to load. The 'No. Requests' columns refer to the expected number of requests that must be sent to fully load the desired web page from the Web Browser (RWB) to the Web Server in the Internet.

As shown in Table 1, the access time for a Page Acceleration system without pre-fetching is reduced in comparison to a conventional VSAT system, and the access time is significantly reduced when the Page Acceleration system uses a pre-fetch process.

Although the descriptions above refer to communications between VSAT hub 304 and PC 306 via remote VSAT 308 and RTA 307, such communications could also be between VSAT hub 304 and PC-VSAT-RTA 310, their operation would be the same, as would the results of Table 1.

While the present invention has been described in connection with the illustrated embodiments, it will be appreciated and understood that modifications can be made without departing from the true spirit and scope of the invention.

What is claimed is:

1. A caching system for a satellite communications system, the caching system comprising:
   a remote client station requesting a selected data page from a host station that is connected to a communications network, the remote client station being coupled to the communications network through the satellite communications system; and
   a cache storing information forming at least a portion of at least one data page, the cache receiving the request for the selected data page and determining whether at least a portion of information forming the selected data page is stored in the cache, when information forming the selected page is stored in the cache, the cache sends the information forming the selected page that is stored in the cache to the remote client station, and the cache further sending a request to the host station through the satellite communications system for information forming the selected data page that is not stored in the cache.

2. The caching system according to claim 1, wherein the remote client station is a VSAT-based client station.

3. The caching system according to claim 1, wherein the remote client station is co-located with the cache.

4. The caching system according to claim 1, wherein the remote client station is coupled to the cache through a satellite communication link.

5. The caching system according to claim 1, wherein the cache has a first portion and a second portion, and
   wherein the remote client station is co-located with the first portion of the cache and is coupled to the second portion of the cache through a satellite communication link.

6. The caching system according to claim 5, wherein the second portion of the cache is connected to the communications network.

7. The caching system according to claim 5, wherein the cache includes a third portion that is coupled to the communications network, and
   wherein the second portion of the cache is coupled to the third portion of the cache through another satellite communication link.

8. The caching system according to claim 1, wherein the host station is a server and the communications network is the Internet.

9. The caching system according to claim 1, wherein the requested data page is a home page for the remote client station.

10. The caching system according to claim 1, wherein the requested data page is a favorite data page for the remote client station.

11. The caching system according to claim 1, wherein the cache determines whether the requested data page is a favorite data page based on a frequency that the data page is requested.

12. The caching system according to claim 1, wherein the requested data page is one of a home page and a favorite page for the remote client station, the cache pre-fetching the requested data page and at least one object contained in the requested data page before the request for the data page is received from the remote client station.

13. The caching system according to claim 12, wherein the cache forms a data cluster from at least one object contained in the requested data page, and sends the data cluster to the remote client station.

14. The caching system according to claim 13, wherein the cache compresses the data cluster.

15. The caching system according to claim 13, wherein when the cache forms the data cluster, the cache multiplexes a plurality of objects contained in the requested data page.

16. The caching system according to claim 1, wherein the remote client station stores information forming the requested data page,
   wherein the cache sends information to the remote client station indicating that the requested data page stored in the remote client station does not need to be updated when information stored in the cache forming the requested data page is up to date.

17. The caching system according to claim 1, wherein the selected data page includes information forming a base page,
   the cache sending the base page to the remote client station when information forming the base page is stored in the cache and sending a request to the host station through the satellite communications system for information forming the base page that is not stored in the cache.

18. The caching system according to claim 17, wherein the cache parses the base page and identifies objects contained in the base page, the cache sending at least one identified object contained in the base page and that is stored in the cache to the remote client station when the at least one identified object contained in the base page is stored in the cache and sending a request to the host station through the satellite communications system for each identified object contained in the base page that is not stored in the cache.

19. The caching system according to claim 18, wherein at least one identified object is an in-line object.

20. The caching system according to claim 18, wherein at least one identified object is a dynamically-embedded object.

21. The caching system according to claim 18, wherein the remote client station receives the base page and the at least one identified object from the cache, and displays the information forming the base page for a predetermined period of time before displaying the at least one identified object contained in the base page.

22. The caching system according to claim 18, wherein the at least one identified object is sent to the remote client station after a predetermined period of time elapses after the base page is sent to the remote client station.

23. The caching system according to claim 17, wherein the cache parses the base page and identifies objects contained in the base page,
   wherein the cache includes a linked list of objects stored in the cache, and
   wherein the cache sends at least one identified object contained in the base page and that is included in the linked list of objects to the remote client station when the at least one identified object contained the linked list of objects is stored in the cache and sends a request to the host station through the satellite communications system for each identified object contained in the linked list of objects that is not stored in the cache.

24. The caching system according to claim 23, wherein the cache sends the linked list of objects to the remote client station, the remote client station synchronizing a list of objects stored at the remote client station with the received linked list of objects stored in the cache.

25. The caching system according to claim 23, wherein the cache receives a list of objects stored at the remote client station from the remote client station, the cache synchronizing the linked list of objects stored in the cache with the received list of objects stored at the remote client station.

26. The caching system according to claim 23, wherein the cache receives from the remote client station information relating to an object handling capability of a browser operating in the remote client station, the cache determining which objects contained in the requested base page to send to the remote client station based on the received information relating to the object handling capability of the browser.

27. The caching system according to claim 1, wherein the selected data page includes information forming a base page,
   wherein the information forming the base page is stored in the cache; and
   wherein the cache receives periodic updates of the information forming the base page from a server hosting the base page.

28. The caching system according to claim 27, wherein the periodically received information received by the cache is received from a multicast transmission.

29. The caching system according to claim 1, wherein the remote client station sends the request for the selected data page to the cache through a tunnel.

30. The caching system according to claim 29, wherein the cache sends the information forming the selected page that is stored in the cache to the remote client station through a tunnel.

31. A method for caching data in a satellite communications system, the method comprising steps of:
   requesting at a remote client station a selected data page from a host station that is connected to a communications network, the remote client station being coupled to the communications network through the satellite communications system;
   storing information forming at least a portion of at least one data page in a cache;
   receiving the request at the cache for the selected data page;
   determining whether at least a portion of information forming the selected data page is stored in the cache;
   sending the information forming the selected page that is stored in the cache from the cache to the remote client station when information forming the selected page is stored in the cache; and
   sending a request from the cache to the host station through the satellite communications system for information forming the selected data page that is not stored in the cache.

32. The method according to claim 31, wherein the remote client station is a VSAT-based client station.

33. The method according to claim 31, wherein the remote client station is co-located with the cache.

34. The method according to claim 31, wherein the remote client station is coupled to the cache through a satellite communication link.

35. The method according to claim 31, wherein the cache has a first portion and a second portion, and
   wherein the remote client station is co-located with the first portion of the cache and is coupled to the second portion of the cache through a satellite communication link.

36. The method according to claim 35, wherein the second portion of the cache is connected to the communications network.

37. The method according to claim 35, wherein the cache includes a third portion that is coupled to the communications network, and
   wherein the second portion of the cache is coupled to the third portion of the cache through another satellite communication link.

38. The method according to claim 31, wherein the host station is a server and the communications network is the Internet.

39. The method according to claim 31, wherein the requested data page is a home page for the remote client station.

40. The method according to claim 31, wherein the requested data page is a favorite data page for the remote client station.

41. The method according to claim 31, further comprising a step of determining at the cache whether the requested data page is a favorite data page based on a frequency that the data page is requested.

42. The method according to claim 31, wherein the requested data page is one of a home page and a favorite page for the remote client station,
   the method further comprising a step of pre-fetching the requested data page and at least one object contained in the requested data page before the request for the data page is received from the remote client station.

43. The method according to claim 42, further comprising steps of:
   forming a data cluster at the cache from at least one object contained in the requested data page; and
   sending the data cluster from the cache to the remote client station.

44. The method according to claim 43, further comprising a step of compressing the data cluster at the cache.

45. The method according to claim 43, further comprising a step of multiplexing a plurality of objects contained in the requested data page when the cache forms the data cluster.

46. The method according to claim 31, wherein the remote client station stores information forming the requested data page,
   the method further comprising a step of sending from the cache information to the remote client station indicating that the requested data page stored in the remote client station does not need to be updated when information stored in the cache forming the requested data page is up to date.

47. The method according to claim 31, wherein the selected data page includes information forming a base page,
   the method further comprising steps of;
   sending the base page from the cache to the remote client station when information forming the base page is stored in the cache; and
   sending a request to the host station through the satellite communications system for information forming the base page that is not stored in the cache.

48. The method according to claim 47, further comprising steps of:
   parsing the base page at the cache;
   identifies objects contained in the base page,
   sending at least one identified object contained in the base page and that is stored in the cache from the cache to the remote client station when the at least one identified object contained in the base page is stored in the cache; and
   sending a request to the host station through the satellite communications system for each identified object contained in the base page that is not stored in the cache.

49. The method according to claim 48, wherein at least one identified object is an in-line object.

50. The method according to claim 48, wherein at least one identified object is a dynamically-embedded object.

51. The method according to claim 48, further comprising steps of:
   receiving at the remote client station the base page and the at least one identified object from the cache, and displaying the information forming the base page for a predetermined period of time before displaying the at least one identified object contained in the base page.

52. The method according to claim 48, further comprising a step of sending the at least one identified object to the remote client station after a predetermined period of time elapses after the base page is sent to the remote client station.

53. The method according to claim 47, wherein the cache includes a linked list of objects stored in the cache, the method further comprising steps of:

parsing the base page at the cache;

identifying at the cache objects contained in the base page;

sending from the cache at least one identified object contained in the base page and that is included in the linked list of objects to the remote client station when the at least one identified object contained the linked list of objects is stored in the cache; and sending from the cache a request to the host station through the satellite communications system for each identified object contained in the linked list of objects that is not stored in the cache.

54. The method according to claim 53, further comprising steps of:

sending from the cache the linked list of objects to the remote client station, and synchronizing at the remote client station a list of objects stored at the remote client station with the received linked list of objects stored in the cache.

55. The method according to claim 53, further comprising steps of:

receiving at the cache a list of objects stored at the remote client station from the remote client station; and synchronizing at the cache the linked list of objects stored in the cache with the received list of objects stored at the remote client station.

56. The method according to claim 53, further comprising steps of:

receiving at the cache from the remote client station information relating to an object handling capability of a browser operating in the remote client station; and determining at the cache which objects contained in the requested base page to send to the remote client station based on the received information relating to the object handling capability of the browser.

57. The method according to claim 31, wherein the selected data page includes information forming a base page, the method further comprising steps of:

storing the information forming the base page in the cache; and receiving at the cache periodic updates of the information forming the base page from a server hosting the base page.

58. The method according to claim 57, wherein the periodically received information received by the cache is received from a multicast transmission.

59. The method according to claim 31, further comprising a set of sending from the remote client station the request for the selected data page to the cache through a tunnel.

60. The method according to claim 59, further comprising a step of sending from the cache the information forming the selected page that is stored in the cache to the remote client station through a tunnel.

61. A multicast system, comprising:

a server content evaluator connected to a computer network, the computer network containing a plurality of stored pages of information each having a predetermined format, the server content evaluator determining in whether a particular page is capable of being multicast to a plurality of client applications and assigning a unique index number to each page determined to be capable of being multicast to a plurality of client applications; and a server content cache coupled to the server content evaluator storing index numbers assigned to pages of information determined to be capable of being multicast to a plurality of client applications, the server content evaluator receiving a request from a client application for a selected page of information and sending the index number for the selected page to the client application when the selected page has an assigned index number stored in the server content cache.

62. The system according to claim 61, wherein the server content evaluator receiving the selected page of information from the computer network when the selected page of information does not have an assigned index number, determining whether the selected page is capable of being multicast to a plurality of client applications, and assigning a unique index number to the selected page when the selected page is determined to be capable of being multicast to a plurality of client applications, the server content evaluator sending the assigned index number for the selected page to the client application.

63. The system according to claim 62, further comprising a server multicast engine coupled to the server content evaluator, the server multicast engine sending the selected page of information to the client application when the server content evaluator determines that the selected page of information does not have an assigned index number, receives the selected page of information from the computer network and then assigns the unique index number to the selected page.

64. The system according to claim 63, wherein the predetermined format is HTML.

65. The system according to claim 63, wherein the computer network is the Internet.

66. The system according to claim 63, wherein the request for the selected page of information is received from a satellite communication link.

67. The multicast system according to claim 63, further comprising:

a client content synchronizer receiving the request from the client application for the selected page of information, the client content synchronizer sending the request for the selected page of information to the server content evaluator and receiving the index number assigned to selected page of information from the server evaluator; and a client content cache coupled to the client content synchronizer storing pages of information, each page of information have an assigned index number, the client content synchronizer sending the received index number for the selected page of information to the client content cache and receiving the selected page of information corresponding to the received index number, the client content synchronizer sending the selected page of information to the client application.

68. The multicast system according to claim 67, further comprising a client multicast engine coupled to the client content cache, the client multicast engine receiving the selected page of information from a server multicast engine when the selected page of information is not stored in the client content cache.

69. The multicast system according to claim 68, wherein the index number assigned to the selected page of information is received from a satellite communication link.

70. The multicast system according to claim 68, wherein the selected page of information is received from a satellite communication link when the selected page of information is not stored in the client content cache.

71. A multicast system, comprising:
a client content synchronizer receiving a request from a client application for a selected page of information, the selected page of information being stored on a computer network in a predetermined format that is capable of being multicast to a plurality of client applications, the client content synchronizer sending the request for the selected page of information to a server content evaluator and receiving an index number assigned to selected page of information from the server evaluator; and
a client content cache coupled to the client content synchronizer storing pages of information, each page of information have an assigned index number,
the client content synchronizer sending the received index number for the selected page of information to the client content cache and receiving the selected page of information corresponding to the received index number, the client content synchronizer sending the selected page of information to the client application.

72. The system according to claim 71, further comprising a client multicast engine coupled to the client content cache, the client multicast engine receiving the selected page of information from a server multicast engine when the selected page of information is not stored in the client content cache.

73. The system according to claim 72, wherein the predetermined format is HTML.

74. The system according to claim 72, wherein the computer network is the Internet.

75. The system according to claim 72, wherein the index number assigned to the selected page of information is received from a satellite communication link.

76. The system according to claim 72, wherein the selected page of information is received from a satellite communication link when the selected page of information is not stored in the client content cache.

77. A method for multicasting data, the method comprising steps of
receiving a request at a server content evaluator from a client application for a selected page of information, the server content evaluator being connected to a computer network, the computer network containing a plurality of stored pages of information each having a predetermined format;
determining whether the selected page has a unique index number stored in a server content cache;
when the selected page does not have a unique index number stored in the server content cache, requesting the selected page from the computer network;
determining whether the selected page is capable of being multicast to a plurality of client applications;
assigning a unique index number to the selected page when the selected page is determined to be capable of being multicast to a plurality of client applications; and
sending the index number for the selected page to the client application, that requested the selected page.

78. The method according to claim 77, further comprising a step of sending the index number for the selected page to the client application that requested the selected page when the selected page has a unique index number stored in the server content cache.

79. The method according to claim 77, further comprising a step of sending the selected page of information to the client application that requested the selected page when the selected page of information is determined to not have an assigned index number when the selected page was requested.

80. The method according to claim 77, wherein the predetermined format is HTML.

81. The method according to claim 77, wherein the computer network is the Internet.

82. The method according to claim 77, wherein the request for the selected page of information is received from a satellite communication link.

83. The method according to claim 77, further comprising steps of:
receiving the request from the client application that requested the selected page for the selected page of information at a client content synchronizer;
sending the request for the selected page of information to the server content evaluator;
receiving the index number assigned to selected page of information from the server evaluator; and
receiving the selected page of information from a client content cache based on the index number assigned to the selected page of information.

84. The method according to claim 83, further comprising a step of receiving the selected page of information from a server multicast engine when the selected page of information is not stored in the client content cache.

85. The method according to claim 84, wherein the index number assigned to the selected page of information is received from a satellite communication link.

86. The method according to claim 84, wherein the selected page of information is received from a satellite communication link when the selected page of information is not stored in the client content cache.

87. A method for multicasting data, the method comprising steps of:
receiving a request from a client application at a client content synchronizer for a selected page of information, the selected page of information being stored on a computer network in a predetermined format that is capable of being multicast to a plurality of client applications;
sending the request for the selected page of information to a server content evaluator;
receiving an index number assigned to selected page of information from the server evaluator;
sending the received index number for the selected page of information to a client content cache;
receiving the selected page of information corresponding to the received index number, and
sending the selected page of information to the client application.

88. The method according to claim 87, further comprising a step of receiving the selected page of information from a server multicast engine when the selected page of information is not stored in the client content cache.

89. The method according to claim 87, wherein the predetermined format is HTML.

90. The method according to claim 87, wherein the computer network is the Internet.

91. The method according to claim 87, wherein the index number assigned to the selected page of information is received from a satellite communication link.

92. The method according to claim 87, wherein the selected page of information is received from a satellite communication link when the selected page of information is not stored in the client content cache.

93. A method for caching data in a satellite communications system, the method comprising steps of;
   storing information forming at least a portion of at least one data page in a cache;
   receiving a request from a remote client station for selected information, the selected information being hosted at a host station that is connected to a communications network, the remote client station being coupled to the communications network through the satellite communications system;
   determining whether the request for the selected information is a request for an HTML file;
   when the request is for an HTML file, determining whether at least a portion of information forming the HTML file is stored in the cache;
   sending the information forming the HTML file that is stored in the cache from the cache to the remote client station when information forming the HTML file is stored in the cache; and
   sending a request from the cache to the host station through the satellite communications system for information forming the HTML file that is not stored in the cache.

94. The method according to claim 93, further comprising steps of:
   pre-fetching the information forming the HTML file before the request for the HTML file is received from the remote client station; and
   storing the pre-fetched information forming the HTML file in the cache.

95. The method according to claim 93, further comprising steps of:
   determining whether the request for the selected information is a request for an object;
   when the request for the selected information is a request for an object, determining whether the requested object is stored in the cache;
   sending the object that is stored in the cache from the cache to the remote client station when object is stored in the cache; and
   sending a request from the cache to the host station through the satellite communications system for the object when the object is not stored in the cache.

96. The method according to claim 95, further comprising steps of:
   receiving the object from the host station; and
   sending the received object to the remote client station.

* * * * *